Dec. 6, 1927.
G. H. ELWELL
1,652,140
SEPARABLE FASTENER
Filed Jan. 24, 1924
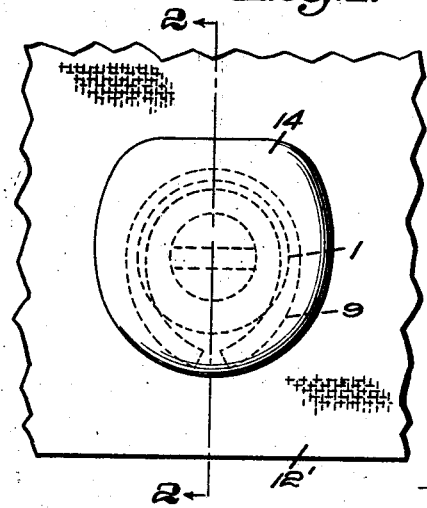
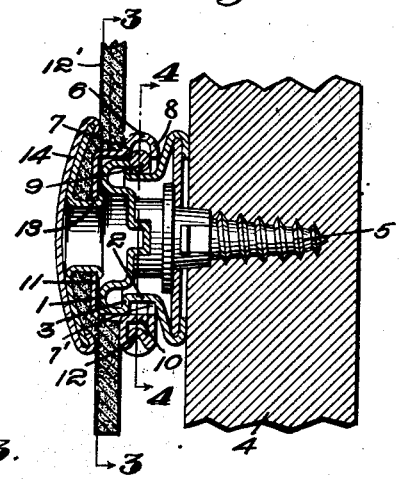
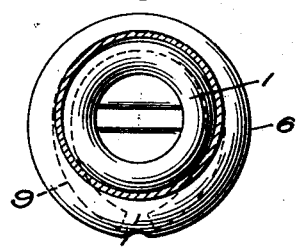
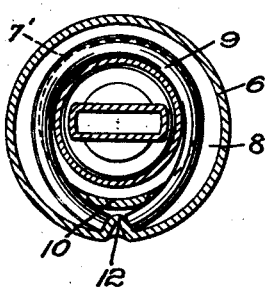
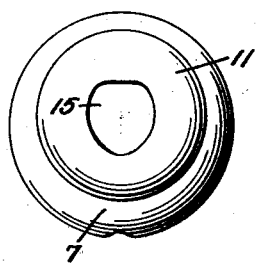
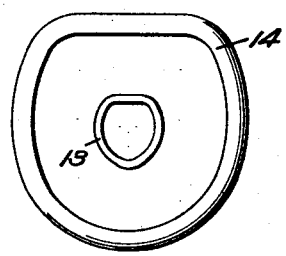
Inventor:
George H. Elwell,
by Emery Booth Janney + Varney
Attys.

Patented Dec. 6, 1927.

1,652,140

UNITED STATES PATENT OFFICE.

GEORGE HENRY ELWELL, OF CLEVELAND, OHIO, ASSIGNOR TO CARR FASTENER COMPANY, OF CAMBRIDGE, MASSACHUSETTS, A CORPORATION OF MAINE.

SEPARABLE FASTENER.

Application filed January 24, 1924. Serial No. 688,208.

This invention aims to provide an improved separable fastener.

In the drawings, which show one illustrative embodiment of my invention:

Figure 1 is a front elevation of a preferred form of fastener, showing some of the parts in dotted lines;

Fig. 2 is a section, partly in elevation, on the line 2—2 of Fig. 1;

Fig. 3 is a section on the line 3—3 of Fig. 2;

Fig. 4 is a section on the line 4—4 of Fig. 2, showing the spring in elevation;

Fig. 5 is an elevation of the socket as viewed from the attaching side; and

Fig. 6 is an elevation of the attaching plate as viewed from the rivet side thereof.

Referring to the drawings and to the preferred form of my invention, selected for illustrative purposes, I have shown a stud having a head 1, a neck 2 and a relatively abrupt shoulder portion 3 between the head and the neck. The stud is secured to a support 4 by a screw 5 held in the stud. This stud, except for the abrupt shoulder, is substantially like that illustrated and described in United States Letters Patent No. 1,433,783, issued October 31, 1922, to Carr Fastener Company, assignee of Moses F. Carr.

The preferred form of socket comprises a casing 6 having a back face 7 and a front face 8, the latter presenting a stud-receiving aperture 7' and holding in the socket a ring-like spring 9 for engagement behind the abrupt shoulder on the stud. The spring, while preferably slightly elongated, is substantially symmetrical and presents a circular portion which engages behind three sides of the neck and shoulder of the stud when secured therewith, and a portion herein shown as an elliptical extension which does not engage the neck or shoulder of the stud.

To position the spring relative to the stud-receiving aperture so that it can engage only three sides of the stud without engaging the fourth side, I have provided a lip 10 pressed forwardly from the dome 11, which is located at the back of the casing. This lip 10 projects toward the front face 8 of the casing and lies closely to and conforms with the periphery of the stud-receiving aperture 7'. This lip also serves as a guide or bearing for the head of the stud when entering the socket and when the socket is being tipped out of engagement therewith. The spring jaw member has spaced apart ends to permit expansion and contraction of the spring, and between these ends I have provided a spring-locating boss 12, which is preferably as shown struck inwardly from the periphery of the casing, and serving to locate the circular part of the spring relative to the lip 10, while keeping the open end of the spring in the desired position.

When the socket is engaged with the stud, it is locked therewith against separation by a strain exerted thereon at the three sides thereof at which the shoulder portion 3 overlies, to a substantial extent, the spring 9. Separation of the fastener may be effected by a tipping movement of the socket relative to the stud at that side adjacent the lip 10.

This tipping action causes the head of the stud to wedge the spring jaw member apart sufficiently so that it may become disengaged from behind the shoulder on the stud and allow passage therethrough of the head of the stud. During this separating movement, one side of the stud head bears against the lip 10, which provides a guiding and supporting surface.

The dome 11 is preferably, as illustrated, concentric with the stud-receiving aperture so as to provide a recess for the head of the stud, and is also used as a means for attaching the socket to the curtain 12' by a rivet 13 which is supported in a cap member 14 located upon the opposite side of the curtain. Where, as in the preferred form of my invention illustrated, the socket is adapted for registration when being attached to the curtain, the rivet preferably is shaped in cross-section to fit relatively closely an unsymmetrical aperture 15 having a periphery which will fit the rivet only in one predetermined way. All of the parts of the socket may be thus so arranged and shaped, as illustrated, that they can only register and be engaged with one another in one relative position, and they can thus be readily located in the desired relation to the curtain. Any suitable indication on the outer face of the cap will then indicate that side of the curtain which should be pulled to effect separation of the stud and socket, this being the side where the generally annular spring does not intersect the stud-receiving aperture in the socket casing, viz, the side adjacent the lip 10.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A snap fastener comprising a stud presenting a head and an abrupt shoulder behind said head in combination with a socket presenting a stud-receiving aperture and a generally annular resilient stud-engaging spring intersecting said stud-receiving aperture at three sides, for engagement with said abrupt shoulder at the three sides of the stud to prevent separation of said fastener by a pull at said three sides and means provided by said casing for spacing said spring away from the stud-receiving aperture for a substantial distance at the fourth side, thereby to preclude engagement of the spring and shoulder at that side and permit separation of said fastener by a pull exerted at that side only.

2. A snap fastener comprising, in combination, a stud and a socket having a casing containing a generally annular stud-engaging spring substantially symmetrically engaging three sides of said stud, to lock said stud and socket against separation at those sides and means holding said spring away from said stud at the fourth side to preclude engagement of said spring with the stud at that side so that said fastener may be separated only by a tipping pull at that side where the spring is precluded from engagement with the stud.

3. A snap fastener comprising, in combination, a stud presenting a head and an abrupt shoulder behind said head, a socket including a casing presenting a stud-receiving aperture, a spring positioned in said casing to engage three sides of said stud when entered in said socket to lock said stud and socket against separation at those sides, and a rigid stud-engaging surface presented by said casing at the fourth side of said stud to preclude engagement of the spring with the stud at that side so that the fastener may be separated by a pull adjacent said surface.

4. In a three-side lock fastener, a stud presenting a head and an abrupt shoulder behind said head cooperating with a socket having a casing presenting a stud-receiving aperture, a generally annular spring in said casing intersecting said aperture at three sides for engagement with said stud and a lip struck up from said casing to provide a wall interposed between the spring and stud-receiving aperture at the fourth side of the stud to prevent engagement of the spring with the stud at that side while said stud and socket are locked by said spring against separation by tipping movement at three sides thereof, said fastener being separable by a pull at the side adjacent said lip.

5. A socket for a three-side lock fastener comprising a casing, a stud-receiving aperture in said casing, a ring-like spring presenting a continuously curved U-shaped portion intersecting said aperture at three sides, and spring-locating means between the aperture and the fourth side of the spring acting upon said spring to move said U-shaped portion into locking engagement with three sides of the neck of a stud after the head of the stud has passed through and expanded said spring and to preclude engagement of the spring with the stud at the fourth side.

6. A socket for a snap fastener comprising a casing, an aperture in the face of said casing, a spring intersecting three sides of said aperture, and a stud-engaging lip struck up from said casing adjacent the fourth side of said aperture, said lip adapted to locate said spring in a predetermined position relative to said aperture and the lip to preclude a substantial portion of said spring from engagement with the shoulder at the fourth side.

7. A snap fastener comprising, in combination, a stud having a head and a neck, a socket including a casing, a spring in said casing, a spring-locating stud-engaging lug integral with said casing for locating said spring relative to said casing, and a dome in the back face of said casing, said neck adapted to engage three sides of said spring to lock said stud and socket together, said head adapted to be guided into said dome by the assistance of said lug, said lug also precluding engagement of the spring with the stud at that side adjacent the lug.

8. A socket for a snap fastener comprising a casing presenting a stud-receiving aperture, a spring in said casing, one-half of said spring substantially circular, while the other half is substantially elliptical, and positioning means between the aperture and the elliptical portion of the spring to retain said spring in a predetermined general relation to said casing and prevent a large portion of the elliptical portion from engaging a co-operating stud.

9. A separable fastener comprising, in combination, a stud having a relatively abrupt annular shoulder, a socket presenting a stud-receiving aperture, a resilient jaw member substantially symmetrical for locking engagement beneath said shoulder at three sides of said stud and an elliptical part to prevent engagement of a substantial portion of said jaw member beneath said shoulder at one side of said stud, said fastener separable only by a pull exerted at the elliptical side of said jaw member.

10. A socket for a snap fastener including a one-piece casing, a generally ring-like stud-engaging expansible and contractible spring located in a determined general relation to said casing, and a stud-receiving aperture eccentrically located relative to said casing thereby to be symmetrically intersected at three sides thereof by said spring and said spring and means formed integral with said casing for holding the spring away from engagement with the stud at the fourth side.

11. A socket for a snap fastener comprising a casing, said casing presenting a peripheral wall, a front face and a back face, a stud-receiving aperture through said front face, an expansible and contractible generally annular spring presenting a continuous curved portion intersecting three sides only of said aperture, said spring interposed between said front face and said back face, and spring-positioning means for spacing said continuous curved portion of said spring from said peripheral wall to prevent substantial lateral shifting thereof when not engaged with a stud.

12. A socket for a three-side lock fastener including a casing, a spring adapted to engage and lock with three sides of a stud, and a support integral with said casing and adapted to engage a fourth side of said stud to permit separation of the stud by a pull adjacent said fourth side.

13. A socket for a three-side lock fastener including a casing presenting a stud-receiving aperture, a spring presenting a curved portion intersecting said aperture and a lip generally aligned with the wall of said aperture at that side of said aperture opposite said curved portion of said spring, said lip adapted to contact with one side of said stud and provide a bearing surface against which the head of the stud may slide during separation of the stud from the socket.

14. A snap fastener comprising, in combination, a stud having a head, a neck and an abrupt shoulder between said head and said neck, a one-piece socket casing presenting a stud-receiving aperture, a guiding wall at one side of said aperture, and a ring-type spring intersecting said aperture at three sides, said guiding wall preventing one side of said shoulder from engaging over the wall of said casing at one side of said aperture when said stud and socket are engaged.

In testimony whereof, I have signed my name to this specification.

GEORGE HENRY ELWELL.

Certificate of Correction.

Patent No. 1,652,140. Granted December 6, 1927, to

GEORGE HENRY ELWELL.

It is hereby certified that error appears in the printed specification of the above-numbered patent requiring correction as follows: Page 3, lines 10 and 11, claim 10, strike out the words " and said spring " and insert the same to follow after the word " casing " in line 8 of same claim; and that the said Letters Patent should be read with this correction therein that the same may conform to the record of the case in the Patent Office.

Signed and sealed this 17th day of January, A. D. 1928.

[SEAL.]
M. J. MOORE,
*Acting Commissioner of Patents.*